United States Patent [19]
Ashcraft et al.

[11] 4,438,175
[45] Mar. 20, 1984

[54] SYNTHETIC FILM WITH A PAPER-LIKE SURFACE AND METHOD OF FORMING SAME

[75] Inventors: Charles R. Ashcraft, Victor; Kurt D. Albertson, Macedon, both of N.Y.

[73] Assignee: Mobil Oil Corporation, New York, N.Y.

[21] Appl. No.: 489,426

[22] Filed: Apr. 28, 1983

[51] Int. Cl.$^3$ ............................ B32B 3/26; B32B 7/02
[52] U.S. Cl. .................................. 428/315.5; 156/229; 264/210.7; 428/315.9; 428/317.9
[58] Field of Search ............... 156/229; 264/41, 210.7; 428/315.5, 315.7, 315.9, 317.9

[56] References Cited

U.S. PATENT DOCUMENTS

| | | | |
|---|---|---|---|
| 4,097,645 | 6/1978 | Toyoda et al. | 428/315.5 |
| 4,118,438 | 10/1978 | Matsui et al. | 260/857 L |
| 4,318,950 | 3/1982 | Takashi et al. | 428/315.5 |
| 4,377,616 | 3/1983 | Ashcraft et al. | 428/213 |

*Primary Examiner*—William J. Van Balen
*Attorney, Agent, or Firm*—Alexander J. McKillop; Michael G. Gilman; James P. O'Sullivan, Sr.

[57] ABSTRACT

An ink receptive synthetic film structure formed by delaminating the void containing a matrix material and the method of preparing the same.

23 Claims, No Drawings

SYNTHETIC FILM WITH A PAPER-LIKE SURFACE AND METHOD OF FORMING SAME

This invention is concerned with a film structure at least one surface of which is characterized by having enhanced printability and writability and further having a comparatively low coefficient of friction.

BACKGROUND OF THE INVENTION

U.S. Pat. No. 4,377,616 describes a lustrous satin-appearing, opaque film composition and the method of preparing the same. While this material is an excellent composite film having good utility in the field of wrapping and packaging, depending upon the polymer employed in the surface layer, difficulty is encountered in printing or writing on its surface in the absence of an after-treatment, such as corona discharge, or modifying the surface in some other fashion. Said U.S. Pat. No. 4,377,616 is, in its entirety, incorporated herein by reference.

It is an object of the present invention to provide a novel film structure, the surface of which is comparatively highly compatible with printing inks and the marking material of pencils and pens. It yet another object of the present invention to provide a film structure of comparatively low coefficient of friction.

It is another object of the present invention to provide a process for the preparation of such a film structure.

SUMMARY OF THE INVENTION

It has been discovered that if the skin layers of the structure defined in U.S. Pat. No. 4,377,616 are sufficiently thick or strong that the structure can be easily split longitudinally throughout the length and breadth of the matrix core layer of the structure. The splitting or delamination causes the matrix to be separated into two separate layers each of which is attached to a skin layer. The surface of each separated matrix layer is somewhat paper-like in nature. In comparison to the skin layer, the new surface is non-even, paper-like, contains microcraters, and is of a lamellae-like configuration. One separated or split film structure of this type can be described in the following manner: an opaque, biaxially oriented polymeric film structure comprising:

at least one layer of a thermoplastic polymer matrix material, within which is located a strata of voids, positioned at least substantially within at least a substantial number of said voids is at least one void-initiating solid particle which is phase-distinct and incompatible with said matrix, the void space occupied by said particle being substantially less than the volume of said void, with one generally cross-sectional dimension of said particle at least approximating a corresponding cross-sectional dimension of said void, a first surface of said first layer being of a non-even, microcrater, lamellae-like, random texturized, ink-acceptable configuration; and a second layer in intimate contact with the second surface of said at least one layer comprising a void-free thermoplastic layer, said layer being of a thickness or strength at least greater than that of the thickness or strength of the delaminatable strata regions of said matrix material.

The split film of the present invention also has other apparent physical characteristics dependent on the thickness of the overall structure. In thicker structures, there is the "feel" of softness and texture.

A version of the same structure which has a printable or writeable surface on both sides is formed by placing two of the afore-described split structures so that the void-free thermoplastic layers thereof are in face-to-face relationship and bonded together in some suitable manner as by heat fusion or by adhesive bonding.

It has also been determined that if care is exercised the voided matrix material, absent any skin or surface film, can be split to form the following structure: an oriented polymeric film structure comprising:

at least one layer of a thermoplastic matrix material, within which is located a strata of voids, positioned at least substantially within at least a substantial number of said voids is at least one void-initiating solid particle which is phase-distinct and incompatible with said matrix, the void space occupied by said particle being substantially less than the volume of said void, with one generally cross-sectional dimension of said particle at least approximating a correspondingly cross-sectional dimension of said void, at least one surface of said layer being of a paper-like, non-even, micro-rough, microcrater-containing, lamellae-like, random textured, ink-acceptable configuration.

An alternative way of describing the film structures of the present invention is as follows: the film structure resulting from the splitting lengthwise and breadthwise through the core matrix of the following three layer structure; an opaque, biaxially oriented polymeric film structure comprising:

a core thermoplastic polymeric matrix material within which is located a strata of voids, positioned at least substantially within at least a substantial number of each of said voids, is at least one void-initiating solid particle which is phase distinct and incompatible with said matrix material, the void-space occupied by said particle being substantially less than the volume of said void, with one generally cross-sectional dimension of said particle at least approximating a corresponding cross-sectional dimension of said void;

void-free, thermoplastic skin layers adhering to the surfaces of said core layer, said skin layers being of a thickness or a strength at least sufficient to withstand, without breaking, the force necessary to cause lengthwise and breadthwise splitting or delamination of said core matrix material.

The process of forming the structure of the present invention involves providing a three layered structure of the type defined above or a void-containing matrix layer alone, and splitting or delaminating and structure through the length and breadth of the core or matrix material of said structure. This can be accomplished by drawing the skin layers or regions of the matrix apart with sufficient force to cause splitting or delamination of the matrix. As the separation occurs, each separated layer can be wound up or inventoried in any suitable manner. If a film structure of a two sided nature is desired the two films can be brought together in non-split surface face to face relationship and bonded in some manner so as to form a common core having two printable surfaces on opposite sides thereof.

DETAILED DESCRIPTION OF THE INVENTION

When non-voided skin or surface layers are employed, in order to insure the continuous splitting of the core layer of the three layer starting material, it is important that the thickness relationship between the thickness dimension of the core and the thickness dimension of the skin layers be modified somewhat from the relationship disclosed in U.S. Pat. No. 4,377,616. Whereas, in said patent, the core thickness was stated to be preferably about 30 to about 85% of the overall structure, with the skin layers making up the remainder of the structure, for the purposes of the present invention it is preferred that the core layer thickness range from about 2 to about 70% and the skin layers range from about 98 to about 30% of the overall structure. This will insure that the skin layers will be of sufficient strength to withstand the force of splitting the core layer.

As with the aforementioned patent it is preferred that the average diameter of the void-initiating particles be from about 0.1 to about 10 microns. These particles, however, do not necessarily have to be spherical in shape so long as the particles function to initiate a void which will on subsequent matrix splitting yield a surface of superior printability or writeability. It is, however, preferred that the particles be spherical in shape so as to initiate a void of unusual regularity and orientation in a stratified relationship throughout the matrix material after biaxial orientation of the system.

The term "strata" is again intended to convey the understanding that there are a large number of voids creating the matrix structure and the voids themselves are oriented so that the two major dimensions thereof are aligned in correspondence with the direction of orientation of the polymeric film structure.

As indicated in the above-identified patent, a typical void of the core region of the structure is defined as having major dimensions X and Y and minor dimension Z, where dimension X is aligned with machine direction orientation, dimension Y is aligned with transverse direction orientation, and dimension Z approximately corresponds to the cross-sectional dimension of the spherical particle which initiated the void. In accordance with the present invention, when this core is split by applying opposing forces to the skin region of the structure, the core splits roughly in the X-Y dimensions of the core. Obviously it is not a sharp, well defined cleavage but separation occurs between the strata of voids to produce the unique printable and writeable surface that remains.

In preparing the three layer structures which are to be split to form the printable and writeable film structures of the present invention, the materials employed are generally the same as those disclosed in U.S. Pat. No. 4,377,616. Accordingly, the void-initiating particles can be organic or inorganic and, preferably, though not necessarily, they are spherical in shape and within the aforementioned particle size range. These particles can be performed and then uniformly dispsersed into a melt of the core matrix material or when the void-initiating particle is a polymer, it can be co-melted with the polymer of the matrix. In this latter case the polymer should be of a higher softening point than that of the material of the matrix and capable of assuming a dispersed phase of small spherical particles as the temperature of the co-melted mix is reduced.

Interesting effects can be achieved by the use of void initiating particles of different colors, and it also is to be understood that the matrix material and/or the skin material likewise can be colored or tinted. Examples of thermoplastic resins which can be the dispersed phase within the matrix material are the polyamides or nylons of commerce, certain polyesters, such as polyethylene terephthalate, acetals, acrylic resins, etc. Inorganic materials include solid or hollow preformed glass spheres, metal beads or spheres, ceramic spheres, etc.

The skin and the core material can be of the same or different resins. Any resin is contemplated which can, on being mixed with the void initiating spheres and after biaxial orientation, yield the described strata of voids. Examples of such resins include polypropylene, poly-4-methyl pentene-1, polystyrene, etc. The following is an example of the preparation of the three layer structure which can be considered the starting material which is to be split or delaminated according to the present invention. This example is essentially the same as Example 1 of U.S. Pat. No. 4,377,616 except the thickness of the core and the skin layers are as stated herein. It is to be understood that "ink-acceptable" means that the split or delaminated surface is at least better in this respect than a void-free surface of the same material.

EXAMPLE 1

A mixture of isotatic polypropylene (93 parts, mp 160° C. and a melt index of 4.5) and nylon-6(7 parts, mp 225° C.) is melted in an extruder provided with a screw of L/D ratio of 20/1. A second extruder is in association with this first mentioned extruder and supplied with the same polypropylene but without the nylon-6 present. A melt coextrusion is carried out while maintaining the cylinder of the core material at a temperature of from 190° C. to 220° C. The polypropylene to be extruded as the skin layers, is maintained at a temperature of 220° C. A film structure is coextruded with a core thickness 6% of the total extruded thickness. The skin layers are each approximately 47% of the total thickness. The unoriented film will be approximately 60 mils in thickness. This sheet is subsequently oriented 5×7½ times using a commercially available sequential biaxial orienting apparatus. MD orientation temperature is about 105° C. and the TD orientation 135° C. The resulting 2.5 mil film will have an opacity of about 80% transmission.

EXAMPLE 2

The film structure of Example 1 is carefully cut at one end thereof so that splitting or delamination can be started throughout the length and breadth of the core layer. Thereafter, a force is applied in generally opposite directions away from the core layer so as to cause a longitudinal and breadth separation to occur in the core layer. By this technique a surface is exposed which has exceptionally good printability or writeability. It is also noted that the exposed surface has a significantly lower coefficient of friction than the homopolymer skin layer.

EXAMPLE 3

The separated films of Example 2 are bonded together adhesively by placing the skin layers in face to face relationship with each other. This produces a film structure which has a printable or writeable surface on both sides thereof.

What is claimed is:

1. An oriented polymeric film structure comprising:

at least one layer of a thermoplastic polymeric matrix material, within which is located a strata of voids, positioned at least substantially within at least a substantial number of said voids at least one void-initiating solid particle which is phase-distinct and incompatible with said matrix, the void space occupied by said particle being substantially less than the volume of said void, with one generally cross-sectional dimension of said particle at least approximately a corresponding cross-sectional dimension of said void, at least one surface of said layer being of a paper-like, non-even, micro-rough, microcrater-containing lamellae-like, random textured, ink-acceptable configuration.

2. An oriented polymeric film structure comprising:
at least one layer of a thermoplastic polymeric matrix material, within which is located a strata of voids, positioned at least substantially within at least a substantial number of said voids is at least one void-initiating solid particle which is phase-distinct and incompatible with said matrix, the void space occupied by said particle being substantially less than the volume of said void, with one generally cross-sectional dimension of said particle at least approximating a corresponding cross-sectional dimension of said void, a first surface of said layer being of a paper-like, non-even microcrater-containing, lamellae-like, ink-acceptable configuration; and
a second layer in intimate contact with the second surface of said at least one layer comprising a void-free thermoplastic layer, said layer being of a thickness or strength at least greater than that of the thickness or strength of the delaminatable strata regions of said matrix material.

3. The film structure of claim 2 wherein said second layer is in intimate contact with two layers of said thermoplastic polymeric matrix material so as to provide a structure having a printable or writable surface on both sides thereof.

4. The film structure resulting from the splitting lengthwise and breadthwise through the core matrix layer of the following three layer structure; an opaque biaxially oriented polymeric film structure comprising:
a core thermoplastic polymeric matrix material within which is located a strata of voids, positioned at least substantially within at least a substantial number of each of said voids, is at least one void-initiating solid particle which is phase-distinct and incompatible with said matrix material, the void-space occupied by said particle being substantially less than the volume of said void, with one generally cross-sectional dimension of said particle at least approximating a corresponding cross-sectional dimension of said void;
void-free, thermoplastic skin layers adhering to the surfaces of said core layer, said skin layers being of a thickness or a strength at least sufficient to withstand without breaking, the force necessary to cause lengthwise and breadthwise splitting or delamination of said core matrix material.

5. The structure of claim 4 wherein said particle is spherical.

6. The structure of claim 4 wherein said particle is inorganic.

7. The film structure of claim 4 wherein said particle is an organic material.

8. The film structure of claim 4 wherein said organic material is a polymer.

9. The structure of claim 4 wherein said structure is a co-extruded structure.

10. The structure of claim 4 wherein said structure is a laminated structure.

11. The structure of claim 4 wherein the core thickness is from about 2 to about 70 percent of said structure.

12. The structure of claim 4 wherein said skin layers are of the same polymeric material as said matrix material.

13. The structure of claim 4 wherein said skin layers are of a different polymeric material from said matrix material.

14. The structure of claim 4 wherein said voids have a dimension of X, Y and Z, wherein dimensions X and Y are major dimensions and dimension Z is a minor dimension at least generally corresponding to the diameter of said particle.

15. The structure of claim 14 wherein said splitting or delamination occurs at least generally in an X Y plane of said core layer.

16. The structure of claim 4 wherein the particles have an average diameter of about 0.1 to about 10 microns.

17. The structure of claim 4 wherein said core and skin polymer is a polyolefin.

18. The structure of claim 17 wherein said polyolefin is polypropylene.

19. The structure of claim 18 wherein said particles are of a nylon.

20. The structure of claim 19 wherein said nylon is nylon-6.

21. A process for preparing a film structure having at least one ink-acceptable surface comprising providing a structure defined as follows:
a thermoplastic polymeric matrix material within which is located a strata of voids, positioned at least substantially within at least a substantial number of each of said voids, it at least one void-initiating solid particle which is phase-distinct and incompatible with said matrix material, the void-space occupied by said particle being substantially less than the volume of said void, with one generally cross-sectional dimension of said particle at least approximating a corresponding cross-sectional dimension of said void;
drawing regions of said layer apart with sufficient force to cause splitting or delamination of said layer and thereby expose a film surface which is paper-like, non-even, micro-roughed, microcrater-containing, lamellae-like, random textured and ink-acceptable.

22. A process for preparing a film structure having at least one ink-acceptable surface comprising providing a three layered structure defined as follows:
a core thermoplastic polymeric matrix material within which is located a strata of voids, positioned at least substantially within at least a substantial number of each of said voids, is at least one void-initiating solid particle which is phase-distinct and incompatible with said matrix material, the void-space occupied by said particle being substantially less than the volume of said void, with one generally cross-sectional dimension of said particle at least approximating a corresponding cross-sectional dimension of said void;
void-free, thermoplastic skin layers adhering to the surface of said core layer said skin layers being of a thickness or a strength at least sufficient to withstand without breaking the force necessary to cause lengthwise and breadthwise splitting or delamination of said core matrix material, drawing said skin layers apart with sufficient force to cause splitting or delamination of said core layer to thereby expose a film surface which is non-even, microroughed, microcrater containing, lamellae-like, randomly textured and ink-acceptable.

23. The process of claim 22 further including placing two of the split structures in face to face bonded relationship with said void-free thermoplastic layers as the core layer thereof.

* * * * *